No. 741,531. PATENTED OCT. 13, 1903.
W. S. McKINNEY.
ENGINE.
APPLICATION FILED JULY 26, 1901.
NO MODEL. 9 SHEETS—SHEET 3.

Witnesses
Charles L. Herrick
Henry C. White

Inventor
Walter S. McKinney
By Jesse & H. M. Cox
Attorneys.

No. 741,531. PATENTED OCT. 13, 1903.
W. S. McKINNEY.
ENGINE.
APPLICATION FILED JULY 26, 1901.
NO MODEL. 9 SHEETS—SHEET 6.
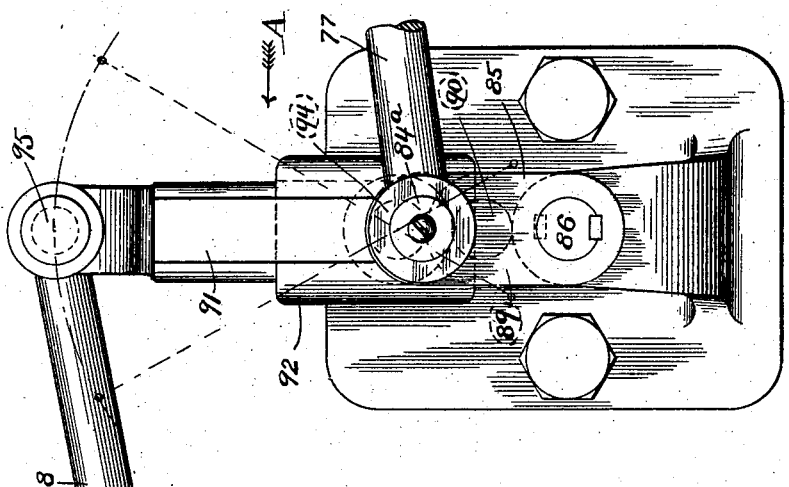
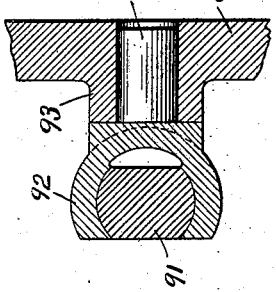
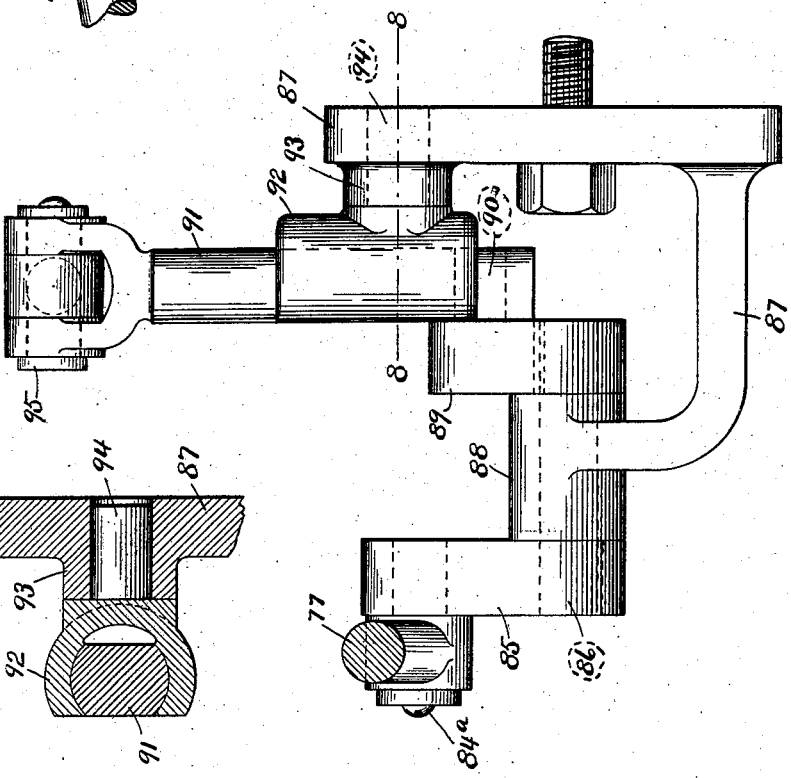
Witnesses
Charles L. Herrick
Harry B. C. White
Inventor
Walter S. McKinney
By Jesse A. M. Cox
Attorneys

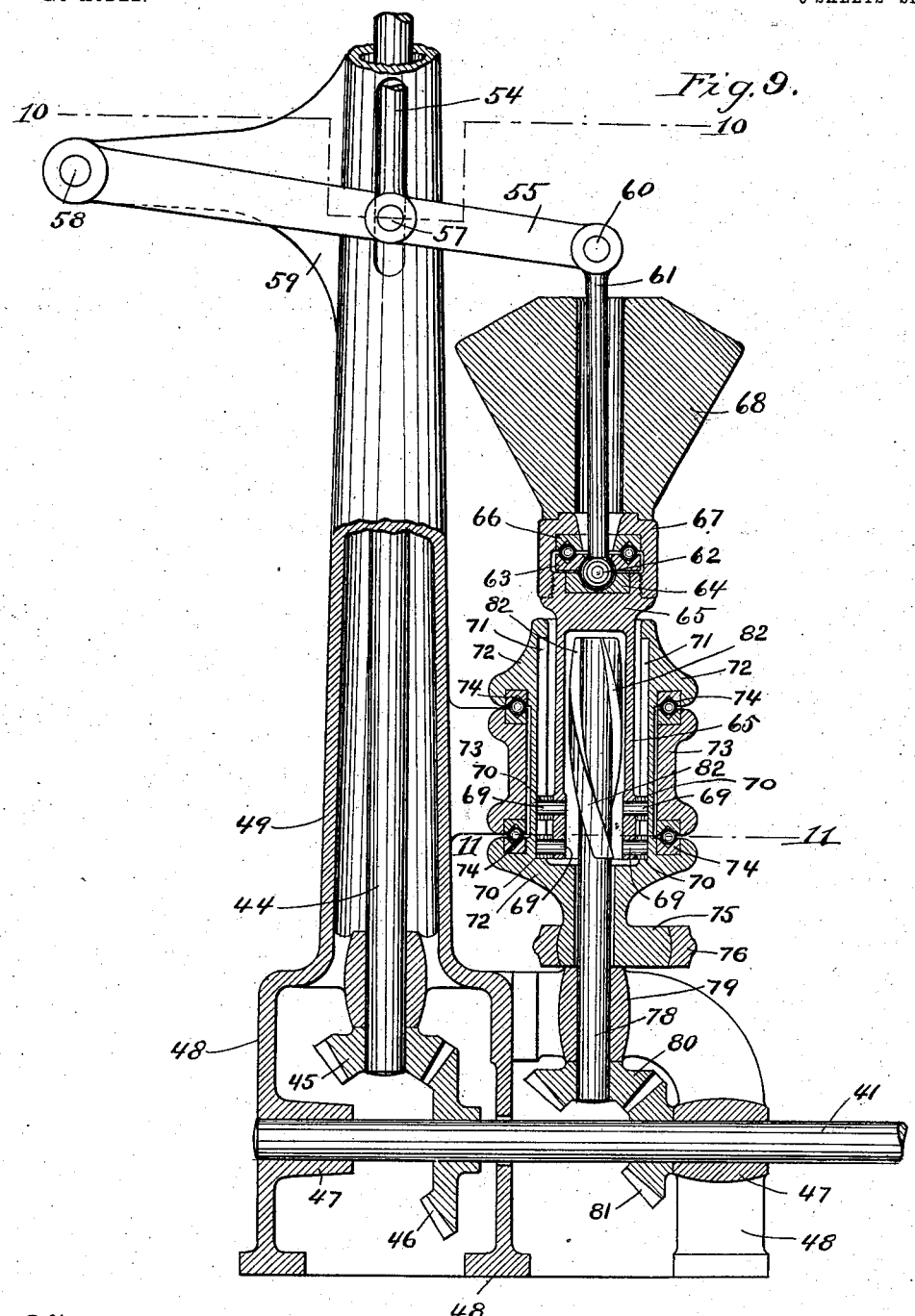

No. 741,531. PATENTED OCT. 13, 1903.
W. S. McKINNEY.
ENGINE.
APPLICATION FILED JULY 26, 1901.
NO MODEL. 9 SHEETS—SHEET 8.

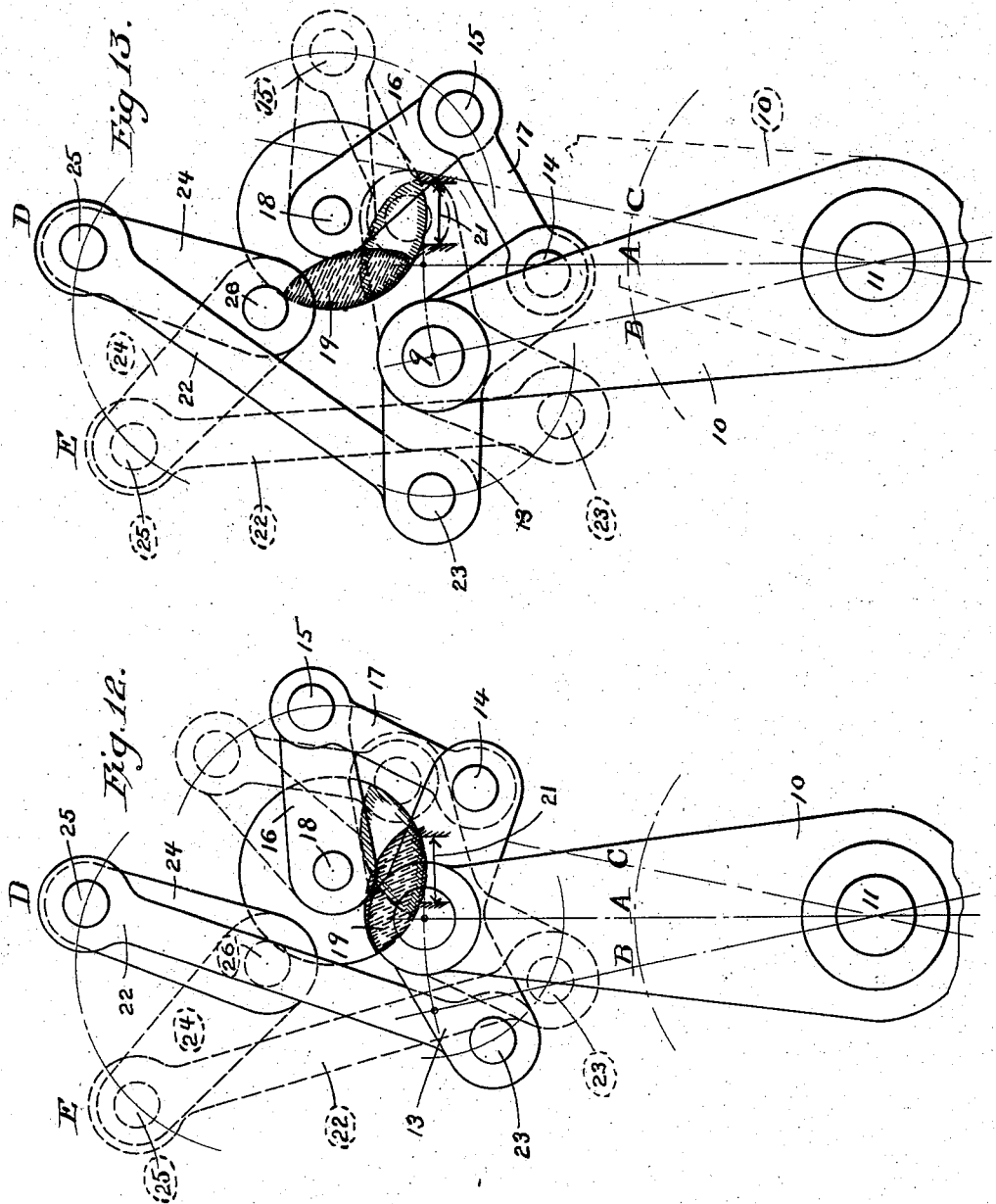

No. 741,531. Patented October 13, 1903.

UNITED STATES PATENT OFFICE.

WALTER SABIN McKINNEY, OF CHICAGO, ILLINOIS.

ENGINE.

SPECIFICATION forming part of Letters Patent No. 741,531, dated October 13, 1903.

Application filed July 26, 1901. Serial No. 69,801. (No model.)

*To all whom it may concern:*

Be it known that I, WALTER SABIN MCKINNEY, a citizen of the United States, residing in the city of Chicago, county of Cook, State of Illinois, have invented a new and useful Improvement in Engines, of which the following is a specification.

My invention relates to engines having separate inlet and outlet valves; and the objects of my invention are, first, to provide a simple and positive acting mechanism for operating the valves, and, second, to provide means for effecting a wide range of variation of the cut-off, and this second object I attain by the valve-motion in conjunction with the reducing mechanism and governing mechanism which are herein described, but which form the subject for separate applications for Letters Patent of the United States—to wit, reducing mechanism, patented May 6, 1902, No. 699,551, and application for speed-governor, filed August 27, 1902, Serial No. 121,158.

I attain my objects by the mechanism illustrated in the accompanying drawings, in which—

Figure 1:
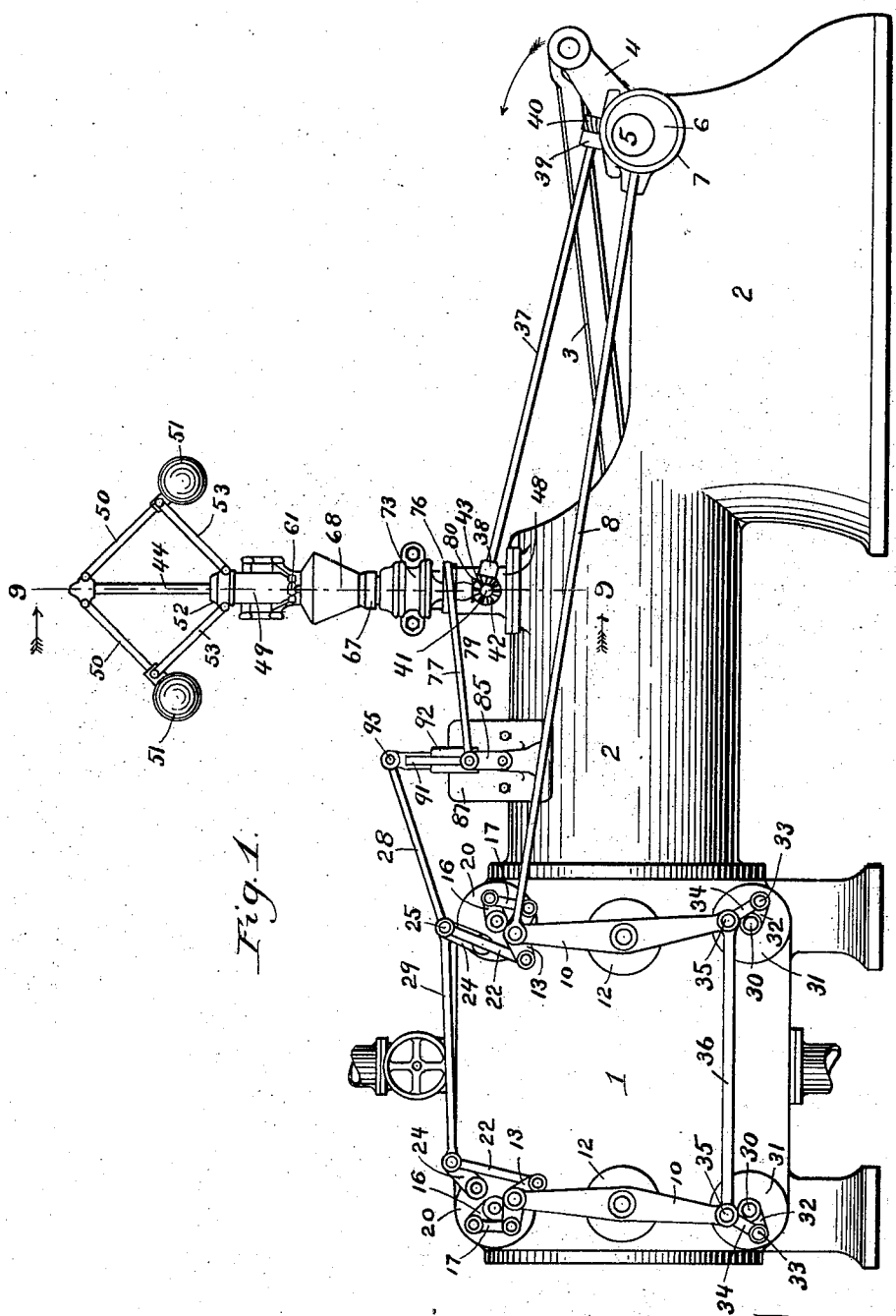
Figure 2:
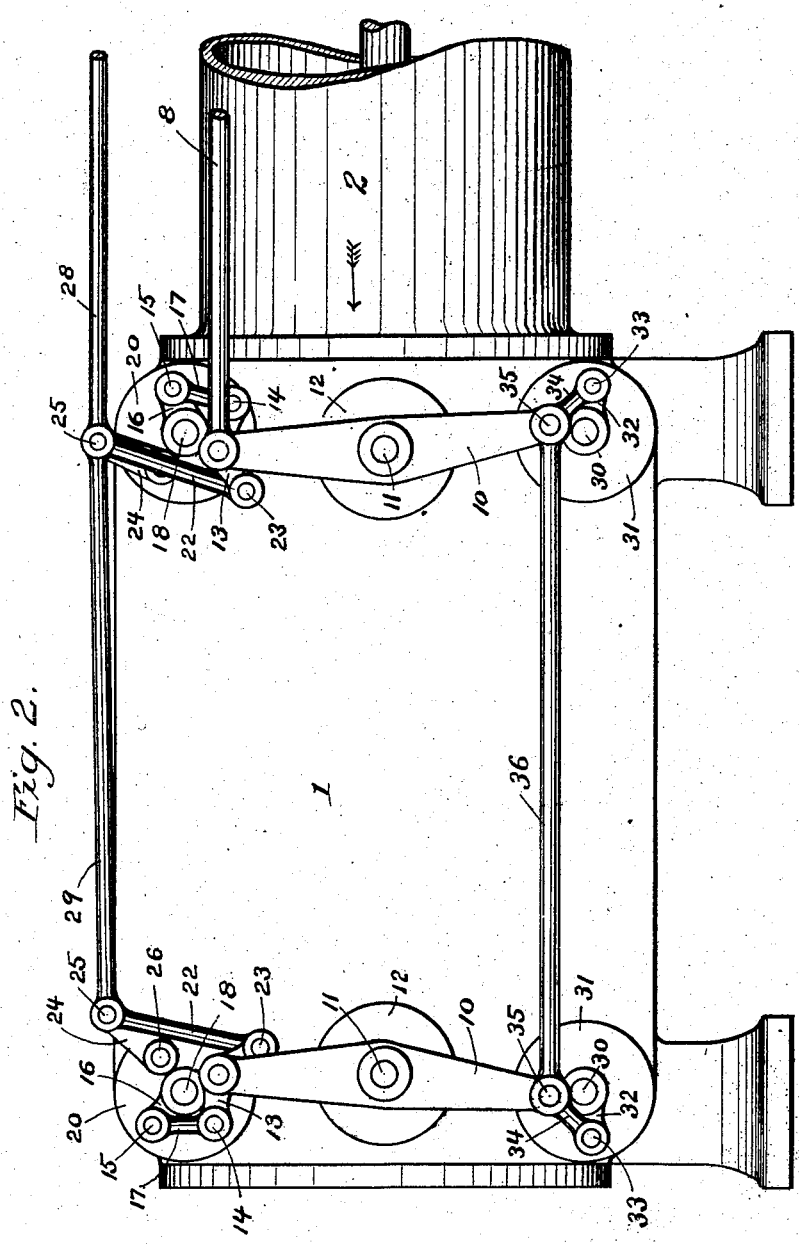
Figure 3:
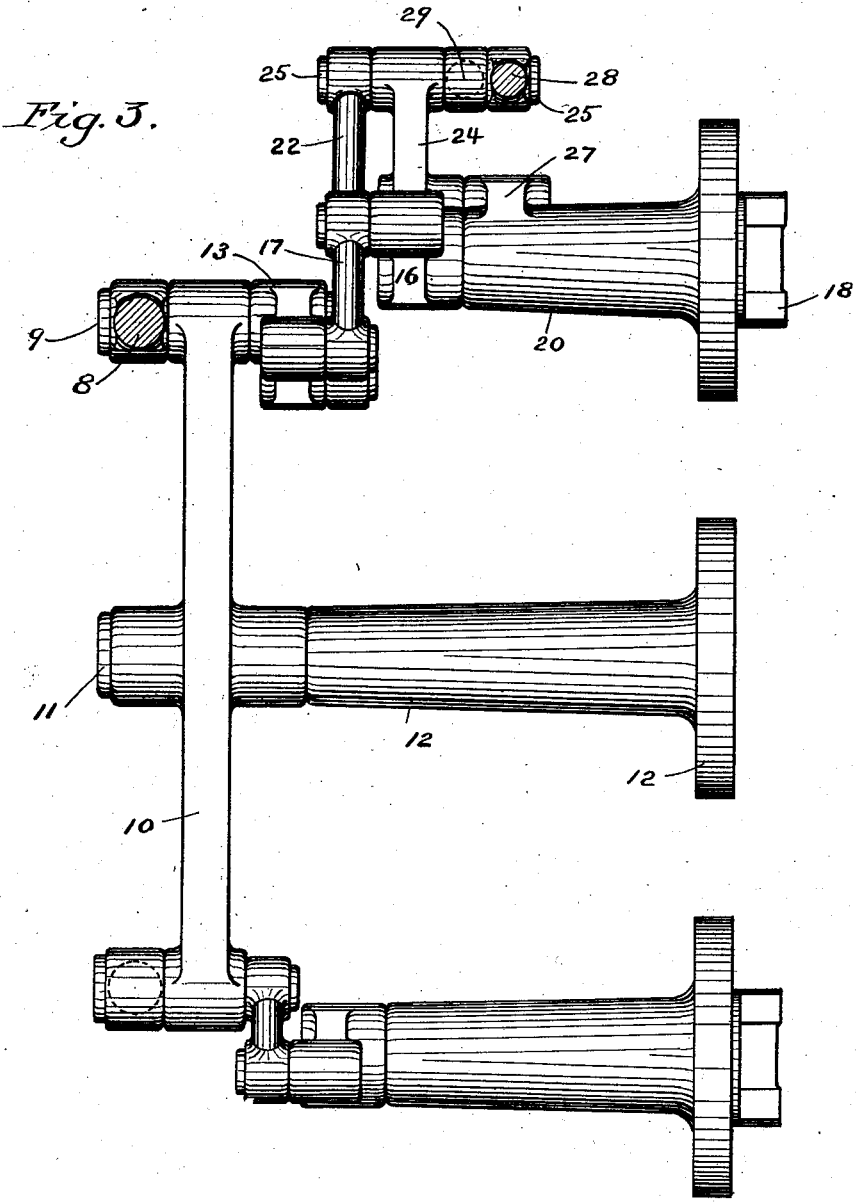
Figure 4:
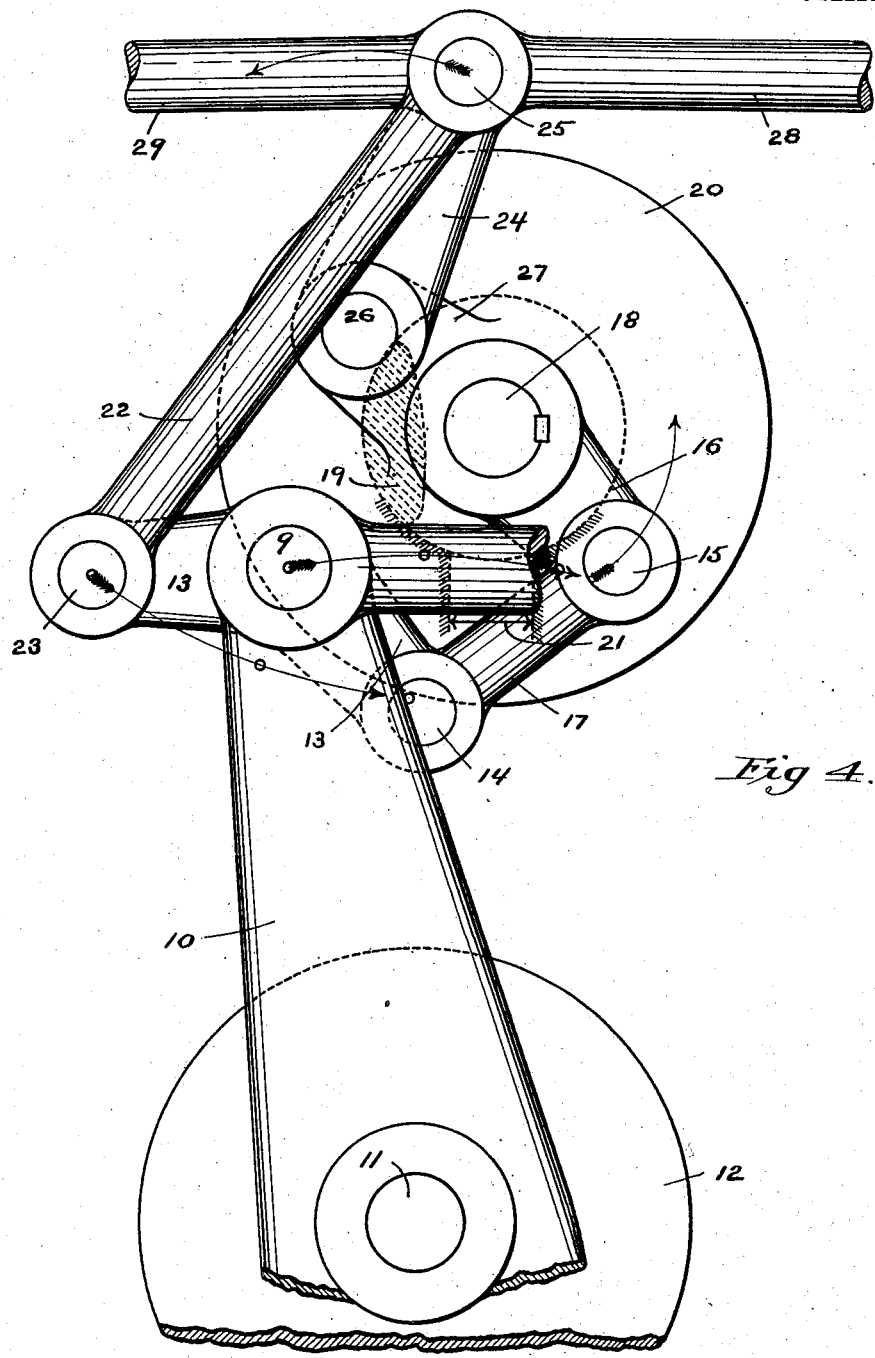
Figure 5:
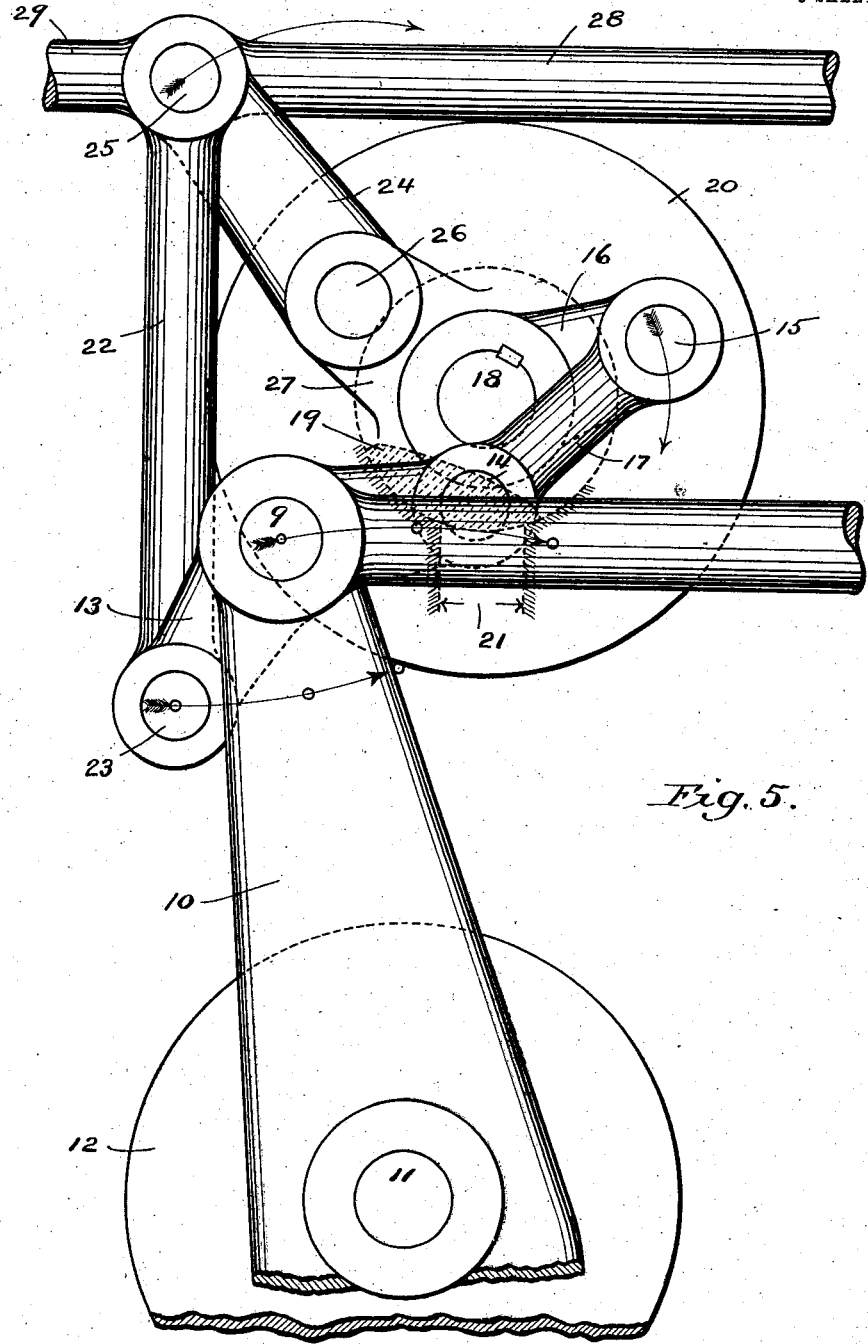
Figure 10:
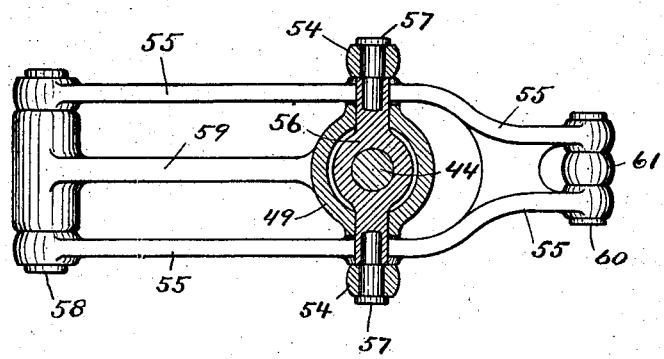
Figure 11:
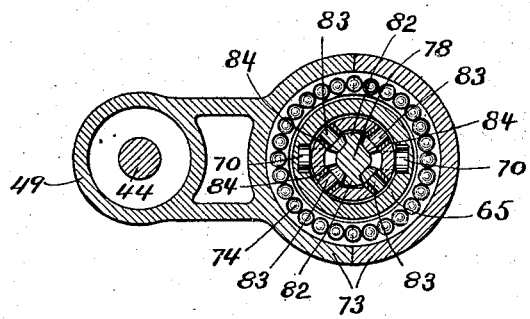

Figure 1 is a general view from the valve-gear side of an engine provided with mechanism embodying my invention. Fig. 2 is a view in side elevation, upon an enlarged scale, of the cylinder and valve-gear as shown in Fig. 1. Fig. 3 is an end elevation of the valve-gear, drawn to an enlarged scale and looking in the direction of the arrow, Fig. 2. Figs. 4 and 5 are detail views from the side, showing different positions of the mechanism operating one of the inlet-valves. Fig. 6 is a detail view of the reducing-motion looking at the face thereof or in a direction transverse to its plane of oscillation. Fig. 7 is a view of the reducing-motion looking in the direction of the arrow at A, Fig. 6. Fig. 8 is a view in detail of parts of the reducing-motion, taken in section on the line 8 8, Fig. 7. Fig. 9 is a view of the governor, taken chiefly in vertical section on the line 9 9, Fig. 1. Fig. 10 is a detail cross-sectional view of the governor in plan, taken on the line 10 10, Fig. 9. Fig. 11 is a detail sectional view of the governor in plan, taken on the line 11 11, Fig. 9. Figs. 12 and 13 are diagrammatic views of the inlet-valve gears, illustrating the operation thereof.

Similar reference characters denote similar parts throughout the several views.

In the drawings, 1 represents the cylinder, and 2 the frame, of an engine embodying my invention. The connecting-rod 3 drives the crank 4 and crank-shaft 5 in the ordinary manner. The eccentric 6, which is secured to said shaft 5, is connected, by means of the eccentric-strap 7 and eccentric-rod 8, to the pin 9 in the wrist plate or lever 10, the rotation of said shaft thereby causing the oscillation of said wrist-lever.

For convenience of description the invention will be considered under three headings—to wit, the valve-motion, the governing mechanism, and the reducing-motion, said governing mechanism and reducing-motion being the subjects of separate applications for Letters Patent, as above mentioned.

*Valve-motion.*—The machine illustrated is a four-valve engine, and as the inlet-valve mechanisms are counterparts and the outlet-valve mechanisms are also counterparts of each other a description of one set will be sufficient, and where the direction of motion of a part is hereinafter referred to it will be understood that reference is made to the part at the inboard end of the cylinder—that is to say, the end thereof nearer the main crank.

The wrist-lever 10 is pivoted upon the wrist-pin 11, formed upon the wrist 12, the latter being secured to the cylinder 1 or otherwise held stationary. In the present instance the bell-crank 13 is pivotally attached to the wrist-lever 10 by means of the pin 9, above mentioned, although said bell-crank may be otherwise located upon said wrist-lever. At one extremity of the part 13 is the pin 14, which is connected to the pin 15 in the steam-valve arm 16 by means of the steam-link 17. Said steam-valve arm 16 is keyed to said stem 18 of the rotary steam-valve 19, the latter being shown in dotted lines, Figs. 4, 5, 12, and 13. The valve-stem 18 has a bearing in the steam-bonnet 20, secured to the side of the cylinder in the usual manner. The steam-inlet port 21 is indicated in dotted lines, Figs. 4, 5, 12, and 13. It is evident that the position of the steam-valve 19 is dependent both upon the position of the wrist-lever 10 and upon the position of the bell-crank relatively to said wrist-lever.

The position of the bell-crank 13 relatively to the wrist-lever 10 is controlled by the governor-link 22, connected to said bell-crank by the pin 23. The opposite extremity of said link 22 is connected to the rocker-arm 24 by means of the pin 25, said rocker-arm being pivoted at its opposite extremity to the fixed stud 26. Said stud is preferably formed upon the boss 27 integral with the steam-bonnet 20, as clearly shown in Figs. 3, 4, and 5. It will be seen that the arm 24 also constitutes one of the factors in determining the position of the bell-crank 13.

The position of the arm 24 is controlled by the rod 28, which is operated from the governing mechanism and which in the present instance is pivotally connected to the pin 25, above mentioned. The two rocker-arms 24 of the inboard and outboard inlet or steam valves are caused to rock simultaneously through the medium of the connecting-link 29.

The rocker-arm 24 and the wrist-lever 10 have an equal number of motions, although the character and phase of said motions may vary. As to difference in character it is desirable that intermediate of the ends of its stroke the rocker shall move quickly, but shall dwell at the said ends of the said stroke. As to difference in phase the amount of opening of the inlet-valve for any given position of the wrist-lever 10 is partially dependent upon the momentary position of said rocker-arm. Hence it is by governing the position of said rocker-arm that the speed of the engine is governed. It is the purpose of the governor to regulate the relative phases of the rocker-arm and wrist-lever, while the dwelling effect is desirably accomplished primarily by the said governor and augmented by the reducing-motion, as will hereinafter appear.

The valve-stem 30 of the outlet-valves (not shown) has a bearing in the exhaust-bonnet 31 and is operated by means of the exhaust-arm 32. The construction of the outlet-valves and adjacent parts is similar to a common construction of these parts in the so-called "Corliss" type of engine. Said arm 32 bears at its extremity the pin 33, which is connected, by means of the link 34, to the pin 35 in the wrist-lever 10. The outlet-arm links 34 are caused to move simultaneously through the medium of the connecting-rod 36.

*The governor or timing mechanism.*—Referring to Figs. 1 and 9, the shaft 37, which is mounted in the bearings 38 and 39, is rotated by means of the spiral gear 40, driven from the crank-shaft 5, or in any other suitable manner. The shaft 41 is driven by means of the bevel-gear 42, meshing with the bevel-gear 43 on said shaft 37. The upright governor-spindle 44 is driven by means of the bevel-gear 45, meshing with the bevel-gear 46 upon the said shaft 41. Said shaft 41 is journaled in suitable bearings 47 47, formed in the governor-frame 48, said frame being preferably mounted in a convenient position upon the engine-frame 2. The governor-column 49 rises from said frame 48, inclosing a portion of said spindle 44 and being provided with suitable bearings therefor. The arms 50 50 are pivotally attached to the upper extremities of the balls 51 51. The collar 52 encircles said spindle 44 and being connected to the arms 50 50 by means of the links 53 53 rises and falls with the latter. Said collar 52 is connected, by means of the links 54, Figs. 9 and 10, to the weighted levers 55. The cross-arm 56, sliding in the vertically-grooved governor-column 49, is connected to said links 54 by means of the pins 57 57, and thereby forms a guide for the lower extremity of said links. The levers 55 are pivoted, by means of the pin 58, to the bracket 59, formed upon the governor-column. The pin 60 forms the connection between the said levers 55 and the upper extremity of the depending rod 61. At the lower extremity of said rod 61 is formed the ball 62, which, in connection with the upper socket-plate 63 and lower socket-plate 64, constitutes a ball-and-socket joint. Said lower plate 64 is let into the vertically-movable sleeve 65, as shown in Fig. 9, while said upper plate 63 is supported upon said ball 62. Said upper plate 63 is grooved in its upper face to register with a similar groove or ball-race in the superimposed plate 66. The bushing 67, which encircles the rod 61 and supports the weight 68, is chambered to receive and rotate with said superimposed plate 66. Said bushing 67 is suitably secured to said sleeve 65, preferably by screw-threading, as shown. The purpose of the described ball-bearing is to lessen the friction between the non-rotating rod 61 and the rotating weight 68. Said sleeve 65 extends downward from said bushing 67 and has, preferably near its lower extremity, the two sets of radially-projecting studs 69 69 for carrying the rollers 70 70. Said rollers are designed to travel in the vertical rectilinear grooves 71 71 in the outer sleeve 72 for imparting the rotary motion of the vertically-movable sleeve 65 thereto. The bracket 73, formed upon the governor-column 49, is provided in its upper and lower faces with the ball-bearings 74 74, whereby said sleeve is supported and allowed to rotate upon a vertical axis, but is prevented from moving laterally or vertically. At the lower extremity of said outer sleeve is formed the eccentric 75, encircled by the eccentric-strap 76 in such a manner that the rotation of said sleeve causes an approximately horizontal motion of said strap. The bearing-surfaces between said eccentric and strap are, however, spherically ground, so as to form a ball-and-socket joint for permitting vertical play of the farther extremity of the eccentric-rod 77, connected to said strap. The rotation of the sleeve 65 is effected by means of the vertical shaft 78, which has a bearing 79 in the governor-frame 48 and is driven by the bevel-gear 80, meshing with the bevel-gear 81 upon the shaft 41. Said vertical shaft 78 extends upwardly through the suitably-apertured sleeve 72 and into the axially-chambered sleeve 65. At its upper portion said shaft has the spiral feathers 82, which act upon the rollers 83, mounted in the bushings 84 in the sleeve 65. In the operation of the governing mechanism when the upright shaft 78 is rotated said spiral feathers operating upon the rollers 83 drive said sleeve 65 at the same speed as said shaft 78, unless there is also a movement of said sleeve in a vertical direction. In this latter case said sleeve will be advanced or retarded according as its vertical movement causes it to move with or against the spiral progression of said feathers. The tendency of said sleeve 65 under the influence of the weight 68 is to remain at the lowest position. Therefore unless said sleeve 65 is moved vertically by reason of the change of position of the governor-balls 51 the sleeves 65 and 72 and eccentric 75 rotate in unison; but if, consequent upon the vertical movement of the governor-balls due to an increase or decrease in the speed of the engine, the sleeve 65 is moved vertically the angular position of the eccentric 75 relatively to the shaft 78 will be advanced or retarded, as the case may be.

The parts are so constructed that when the engine is running at a uniform rate of speed and the governor-balls have no vertical motion the eccentric-rod 77 will make the same number of strokes as the main piston of the engine. It is desirable, however, in order to obtain great sensitiveness in the governor to so proportion the gearing that the governor-balls 51 will make a greater number of revolutions per minute than the main crank 4.

*The reducing-motion.*—It is evident that the motion of the eccentric-rod 77 lengthwise will be approximately a simple harmonic motion, or, roughly speaking, said rod will have a quicker movement between the ends of its strokes than at the ends thereof, and it is to exaggerate this characteristic of the movement of the rod that the reducing-motion is employed.

Referring to Figs. 1, 6, 7, and 8, the eccentric-rod 77 is connected by the pin 84ª to the free extremity of the rocker-arm 85. Said arm is keyed to and causes the partial rotation of the rock-shaft 86. The bracket 87, which is bolted to the engine-frame or otherwise held stationary, is provided with a journal 88, constituting a fixed bearing for said rock-shaft 86. Also keyed to said shaft 86 is a rocker-arm 89, which carries at its free extremity a pin 90, forming a pivotal connection between said arm 89 and the rocking lever 91. Said lever 91 is slidingly mounted in the guide 92, the latter being pivoted to the boss 93 of the bracket 87 by means of the pin 94. The upper extremity of the lever 91 is pivotally connected, by means of the pin 95, to the rod 28, above described. In order to simplify construction, it is desirable that said lever 91 have a cylindric bearing in the guide 92 in the manner shown in Fig. 8.

In the operation of the reducing-motion the movement of the eccentric-rod 77 causes the simultaneous rocking of the arm 85 and arm 89, for the reason that said arms are both keyed to the same rock-shaft 86. When the pin 86, shaft 90, and lever 91 are approximately in line, the motion of the pin 95 is very rapid; but said motion is gradually diminished as the end of the stroke is approached. On the return stroke the reverse is true, the motion of the pin 95 being accelerated from a slow motion at the end of the stroke to a rapid motion at the middle thereof. This is due to the fact that near the ends of the stroke the length of the lever 91 above the pin 94 is being decreased, for said lever is being drawn downward in the guide 92. As a result the pin 95 dwells at the ends of strokes of the lever 91.

It has been above stated that the eccentric-rod 77, whereby the rocker-arm 85 is operated, has itself a dwell at the ends of its strokes, and as a result of the combination of the eccentric-rod 77 with the present reducing-motion the link 28 has a compound movement, the special characteristic whereof is the rapidity of movement at the center of the stroke and the slowness of movement at the end of the stroke. By this combination it is easy to obtain within the limits of good practice a condition in which the link 28 is substantially still during four-fifths of its stroke.

The operation of the inlet or steam valves will be best understood by reference to the diagrammatic views Figs. 12 and 13, wherein three principal positions of the wrist-lever 10 are indicated by the three positions A, B, and C of the dot-and-dash line joining the centers of the pivotal points 9 and 11 on said lever. Disregarding considerations of lap and lead the valve will be closed during one-half the revolution of the engine and if opened at all will be open during a greater or less portion of the remaining half-revolution of the engine. In the diagrams, A represents the position of the lever 10 at a time when the steam-valve 19 is about to open to admit steam through the inlet-port 21. This position is indicated by said lever in full lines, Fig. 12. Position B of said lever (shown in full lines, Fig. 13) is the extreme position of said lever for steam to enter the cylinder through said valve. Position C of said lever (shown in dotted lines, Fig. 13) is the extreme position of said lever when the steam-valve is closed. As shown in the present drawings, position A represents said lever in an upright position, B a position wherein the upper extremity of said lever is at the extreme left, and C a position at the extreme right. Bearing in mind that said diagrams represent the parts at the inboard or right end of the main cylinder, the steam-valve 19 will under all conditions be closed while the lever 10 is between positions A and C, while said valve may be open during a greater or less portion of the time when the lever is between positions A and B. The pin 25 at the free extremity of the rocker-arm 24 is shown in its two extreme positions, D indicating its position at the extreme right for having a closing effect on the steam-valve 19 and E indicating its position at the extreme left for having a closing effect on said valve. Position D is shown in full lines in each of said figures and position E in dotted lines. When the parts are in positions A and D, the valve 19 is about to open. If pin 25 remains stationary while lever 10 moves toward the left, the valve 19 will open quickly on account of the proportions and arrangement of the parts. If now the pin 25 remains at position D during a complete half-revolution of the engine—that is to say, while said lever is moving from position A to position B and return to A—the valve will have been opened the maximum possible time, amounting under proper design of the engine to, say, seven-eighths of said half-revolution. This seven-eighths cut-off is the extreme case and is due to the operation of the governor, which under these conditions so times the pin 25 as to remain substantially still during the stroke and move to position E at about the time lever 10 reaches position B. The inlet-valve 19 is so proportioned as to be closed during the time the lever 10 is passing from position A to position C and return regardless of the position of the pin D, for it is during this time that the exhaust-vave is open, as will be hereinafter explained. As a matter of fact, however, under this extreme cut-off about the time that lever 10 has returned to position A on its way to position C the pin 25 is moved by the governing mechanism to position E and remains in position E during the next half-revolution of the engine, when it returns to position D, and the cycle is completed. Considering the engine at normal speed with approximately one-fourth cut-off, (the cycle commencing, as before, with lever 10 in position A and pin 25 in position D,) said lever moves toward position B; but the governor is now in such condition that when the main piston has traveled approximately one-fourth stroke said governor quickly throws the pin 25 to position E. This motion of the pin acts upon the connected parts in such a manner as to quickly close the valve 19 even though the same were at the previous moment wide open. The lever then continues the cycle as before, the valve remaining closed during the remainder of the forward stroke of the piston and during the backward stroke thereof. As the periods of operations of the pin 25 correspond with the periods of the lever 10, the pin 25 returns to position D before lever 10 again reaches position A on the way to position B, so that the valve 19 may always open promptly. If the engine is running too rapidly and the speed is to be lowered, the action of the governor is such that the pin 25 is caused to move to position E earlier in the course of the progress of lever 10 from position A toward position B, and in the extreme case said pin will be moved to position E practically as soon as said lever commences its movement from A toward B, thereby maintaining the valve 19 in a closed position during the whole of both the forward and backward strokes of the main piston. In the operation of the outlet or exhaust valves at the bottom of the cylinder 1 the rocking of the lever 10 from position A to position B has practically no effect upon said valves on account of the relative positions of the exhaust-link 34 and exhaust-arm 32; but the motion of the lever 10 from position A toward position C causes said valve (operated by the stem 30) to open quickly and remain open during practically one-half revolution of the engine.

It will be understood that in practice it would be desirable for well-recognized reasons to slightly alter the above-described adjustment of the parts—as, for example, in order to obtain suitable cushioning of the main piston. It is obvious also that the motion imparted to the pins 9 and 35 at the extremities of the levers 10 may be effected from a single wrist-plate in the manner common to engines of this type.

Other variations in construction may be had without departing from my invention. For example, the shafts 44 and 78 may be rotated by separate mechanisms, it being essential only that the speed of said shafts be dependent upon the speed of the engine.

I claim—

1. In an engine, a valve-gear comprising a wrist-lever, a second lever pivotally connected thereto, an arm for operating the inlet-valve, link connections between said second lever, and said arm, and means for regulating the relative positions between said first and said second levers.

2. In an engine, a valve-gear comprising a wrist-lever, a bell-crank pivotally supported thereon, connections between said bell-crank and the inlet-valve for operating the latter, and pivotally-connected links for governing the position of said bell-crank relatively to said wrist-lever.

3. In an engine, a valve-gear comprising a wrist-lever, a bell-crank pivotally supported thereon, connections between said bell-crank and the inlet-valve, for operating the latter, a rocker-arm having a fixed pivot at one end, and connections between the free end of said rocker-arm and said bell-crank.

4. In an engine, a valve-gear comprising a wrist-lever, a bell-crank pivotally supported thereon, connections between said bell-crank and the inlet-valve, for operating the latter, a rocker-arm having a fixed pivot at one end, and a link joining the free end of said rocker-arm and said bell-crank.

5. In an engine, a valve-gear comprising a wrist-lever, a bell-crank pivoted intermediate of its extremities to said wrist-lever connections between one extremity of said bell-crank and the valve, and other connections between the opposite extremity of said bell-crank and a fixed pivot.

6. In an engine, a valve-gear comprising a wrist-lever, a bell-crank pivoted to said wrist-lever, a valve-arm, a link connecting the free extremity of said valve-arm to said bell-crank, a rocker-arm one extremity whereof has a fixed pivot, and a second link connecting said rocker-arm to said bell-crank.

7. In an engine, a valve-gear comprising a wrist-lever, a bell-crank pivoted thereto, an arm for operating the inlet-valve, link connections between said bell-crank and said inlet-valve arm, and means for regulating the position of said bell-crank relatively to said wrist-lever; in combination with an outlet-valve arm, and link connections between said outlet-valve arm and said wrist-lever.

8. In an engine, a pair of wrist-levers pivotally supported between their extremities, one of said levers being connected to the main eccentric of the machine, a rod connecting said levers for causing said levers to oscillate in equal periods of time; bell-cranks pivoted to said levers, connections between said bell-cranks and the inlet-valves of the engine; other connections between each of said bell-cranks and a fixed pivot; and other connections between said wrist-levers and the outlet-valves of the engine.

9. In an engine, a valve-gear comprising a wrist-lever, a crank pivoted thereto, connections between said bell-crank, and the inlet-valve, a rocker-arm having a fixed pivot, connections between said rocker-arm and said bell-crank, and means for governing the position of said rocker-arm independently of said wrist-lever.

10. In an engine, the combination of a governor-eccentric, a governor for timing the revolution of said eccentric, a valve-gear, and a reducing-motion interposed between said eccentric and said valve-gear.

11. In an engine, the combination of a governor-eccentric, a governor for timing the revolution thereof, a valve-gear and a reducing-motion operated by said eccentric, said reducing-motion comprising an oscillating lever, a pivoted guide wherein said lever is slidingly mounted, a rocking arm pivoted to said lever, a rock-shaft keyed to said arm and connected to and operated by said eccentric.

12. In an engine, the combination of a governor-eccentric, a governor for timing the revolution thereof, a valve-gear, an oscillating lever connected to said valve-gear, a pivotally-supported guide wherein said oscillating lever is slidingly mounted, a rock-shaft, an arm keyed to said shaft and pivoted to said oscillating lever, a second arm keyed to said rock-shaft and connections between said arm and said governor-eccentric.

13. In an engine, an inlet-valve gear comprising a wrist-lever, a rotary valve having a fixed axis, a set of links connecting said wrist-lever to said valve, said connecting-links having at least two floating joints interposed between said wrist-lever and said valve, and means for governing the relations between said wrist-lever and the adjacent connecting-link.

14. In an engine, an inlet-valve gear comprising a wrist-lever, a rotary valve having a fixed axis, a set of links connecting said wrist-lever to said valve, said set of links having at least two floating joints interposed between said wrist-lever, and the axis of said valve; and a second set of links connecting the said wrist-lever with a fixed pivot, the link pivoted on said wrist-lever being common to both sets of links, and said second set of links being connected to the governing mechanism.

WALTER SABIN McKINNEY.

Witnesses:
CHARLES L. HERRICK,
ARTHUR M. COX.